United States Patent
Lei

(10) Patent No.: US 9,996,544 B2
(45) Date of Patent: Jun. 12, 2018

(54) PROCESSING METHOD AND TOUCH TERMINAL FOR MERGE AND DEDUPLICATION OPERATIONS ON CONTACT ENTRIES

(71) Applicant: HUIZHOU TCL MOBILE COMMUNICATIONS CO., LTD., Huizhou (CN)

(72) Inventor: Ming Lei, Huizhou (CN)

(73) Assignee: HUIZHOU TCL MOBILE COMMUNICATION CO., LTD., Shenzhen, Guangdong (CN)

( * ) Notice: Subject to any disclaimer, the term of this patent is extended or adjusted under 35 U.S.C. 154(b) by 303 days.

(21) Appl. No.: 14/439,174

(22) PCT Filed: Apr. 16, 2014

(86) PCT No.: PCT/CN2014/075516
§ 371 (c)(1),
(2) Date: Apr. 28, 2015

(87) PCT Pub. No.: WO2015/024387
PCT Pub. Date: Feb. 26, 2015

(65) Prior Publication Data
US 2015/0310029 A1     Oct. 29, 2015

(30) Foreign Application Priority Data
Aug. 19, 2013  (CN) .......................... 2013 1 0361512

(51) Int. Cl.
*G06F 17/30*  (2006.01)
*H04M 1/2745*  (2006.01)

(52) U.S. Cl.
CPC .. *G06F 17/30156* (2013.01); *G06F 17/30082* (2013.01); *H04M 1/274533* (2013.01); *H04M 2250/22* (2013.01)

(58) Field of Classification Search
CPC ........ G06F 17/30156; G06F 17/30082; H04M 1/274533
See application file for complete search history.

(56) References Cited

U.S. PATENT DOCUMENTS

| 2011/0307455 | A1 | 12/2011 | Gupta et al. |
| 2012/0030566 | A1* | 2/2012 | Victor ................... G06F 3/0482 715/702 |
| 2013/0203468 | A1* | 8/2013 | Weng .............. H04M 1/274533 455/564 |

FOREIGN PATENT DOCUMENTS

| CN | 103037061 A | 4/2013 |
| CN | 103095900 A | 5/2013 |

(Continued)

OTHER PUBLICATIONS

CN 103179244 A—machine translation in English.*
First Office Action, issued by the Chinese Intellectual Property Office, in regard to CN 201310361512.6, dated Dec. 9, 2014.

*Primary Examiner* — Mark D Featherstone
*Assistant Examiner* — Faezeh Forouharnejad
(74) *Attorney, Agent, or Firm* — Shimokaji & Associates, P.C

(57) ABSTRACT

A processing method and a touch terminal for merge and deduplication operations on contact entries may include opening an address book and displaying all contact entries, recording selected contact entries according to a selection action on contact entries, receiving a drag action to merge contact entries, and merging the selected contact entries according to the drag action. The processing method and touch terminal may further include removing the duplicated information in the selected contact entries during merging, and detecting conflict information in the selected contact entries. Thereby, redundant records in an address book may be deleted by dragging contact entries to be merged, remov- (Continued)

ing the duplicated information while merging, and detecting conflict information, which may enhance a smart effect of the touch terminal and may improve user experience.

19 Claims, 2 Drawing Sheets

(56) References Cited

FOREIGN PATENT DOCUMENTS

| | | | |
|---|---|---|---|
| CN | 103179244 A | * | 6/2013 |
| CN | 103442135 A | | 12/2013 |

* cited by examiner

PROCESSING METHOD AND TOUCH TERMINAL FOR MERGE AND DEDUPLICATION OPERATIONS ON CONTACT ENTRIES

TECHNICAL FIELD

The present disclosure generally relates to the field of intelligent terminal technologies. In particular, the disclosure relates to a processing method and a touch terminal for merge and deduplication operations on contact entries.

BACKGROUND

Contact information on an intelligent terminal, such as a smartphone, can be entered into a contact list, and may be input manually, imported by a SIM card, imported by a SD card, imported from a network data backup, and the like. As part of a contact list import process, duplicated or redundant information may exist. For example, multiple records may correspond to a same contact name, a contact may have a same telephone number, and/or other information (e.g. address, etc.). Furthermore, multiple records may correspond to the same contact name, a contact's telephone numbers may be different or not completely the same (i.e. there may be multiple numbers), and/or other information (e.g. address, etc.) may not be the same.

When encountering the above situations, a user may spend more time finding a desired number from a contact list, and may manually perform a merging processing on the redundant or duplicated information. Since a smartphone itself does not know what needs to be merged and what does not need to be merged (because there may be two different contacts having the same name), the user can only delete some redundant information and merge duplicated information through manual processing.

When processing the above redundant and/or duplicated information, a user typically opens contact entry information, selects an undesired record (i.e., the contact entry), and then deletes the selected record. Alternatively or additionally, the user may need to add information from other contact entries (e.g., adding a telephone number) into one of the contact entries, and/or may delete other contact entries. All of these processes require the user to carry out many complicated operations, for example, open many windows, and/or switch among different windows, which is inconvenient, and does not implement intelligent features of an intelligent terminal.

SUMMARY

Objects of the present invention are to provide a processing method and a touch terminal for merge and deduplication operations on contact entries, which merge contact records by dragging contact entries, remove duplicated information while merging, and detect conflicting information.

To obtain the above objects, the present invention employs the following technical solutions:

A method for processing merge and deduplication operations on contact entries includes opening an address book and displaying contact entries; recording selected contact entries according to a selection action performed on the contact entries; receiving a drag action to merge contact entries merging the selected contact entries according to the drag action; removing duplicated information in the selected contact entries during merging; and detecting conflict information in the selected contact entries.

In another embodiment, a method for processing merge and deduplication operations on contact entries includes sorting contact entries according to contact names.

In a further embodiment, a method for processing merge and deduplication operations on contact entries includes when detecting two touch points on a touchscreen, recording all contact entries between spatial coordinates of said two touch points; and receiving a drag action to merge contact entries and, when a first contact entry at one touch point is dragged to partially overlap with a second contact entry at another touch point, merging said all contact entries.

In yet another embodiment, a method for processing merge and deduplication operations on contact entries includes when detecting two touch points on a touchscreen, recording contact entries in the address book at spatial coordinates of said two touch points; and receiving a drag action to merge contact entries and, when a first contact entry at one touch point is dragged to partially overlap with a second contact entry at another touch point, merging these two contact entries.

In yet a further embodiment, a method for processing merge and deduplication operations on contact entries includes first and second contact entries in an address book, at coordinates of two touch points, that are two adjacent contact entries or two separated contact entries in the address book.

In another embodiment, a method for processing merge and deduplication operations on contact entries includes, when dragging a contact entry, an offset is set through a function offsetTopAndBottom(d) for an associated view.

In a further embodiment, a method for processing merge and deduplication operations on contact entries includes, when merging contact entries, removing duplicated information in selected contact entries; detecting if there is conflict among information in the selected contact entries; if conflict is detected among information in the selected contact entries, outputting a prompt message to prompt a user whether to ignore the conflicted information; if the user selects to ignore the conflicting information, saving the conflicted information.

In yet another embodiment, a method for processing merge and deduplication operations on contact entries includes selected contact entries that are merged through a function madapter.mergeContacts(choosedobjs).

In yet a further embodiment, a method for processing merge and deduplication operations on contact entries includes opening an address book and displaying contact entries; recording selected contact entries according to a selection action performed on the contact entries; receiving a drag action to merge contact entries; merging the selected contact entries according to the drag action; removing duplicated information in the selected contact entries during merging; and detecting conflict information in the selected contact entries when merging contact entries, removing duplicated information in the selected contact entries; detecting if there is conflict among information in the selected contact entries; if conflict is detected among information in the selected contact entries, outputting a prompt message to prompt a user whether to ignore the conflicted information; if the user selects to ignore the conflicting information, saving the conflicted information; wherein attributes of each contact entry are compared, if an attribute only exists in one contact entry, no conflict is indicated; if multiple contact entries have an identical attribute, and the attributes have a same value, the contact entries are indicated as including duplicated information and to have no conflict; when multiple contact entries have an identical attribute and more than two values are different, a conflict will be detected and the conflict information is recorded, including a name of the conflict item and conflict content, and prompting the user whether to ignore the conflicting information, if the user chooses to ignore the conflicting information, then keeping the conflicted information, if the user selects not to ignore the conflicting information, conflicting information is deleted according to the user selection.

In another embodiment, a touch terminal for processing merge and deduplication operations on contact entries includes, when merging contact entries, removing duplicated information in the selected contact entries; detecting if there is conflict among information in the selected contact entries; if conflict is detected among information in the selected contact entries, outputting a prompt message to prompt a user whether to ignore the conflicted information; if the user selects to ignore the conflicting information, saving the conflicted information.

In a further embodiment, a touch terminal for processing merge and deduplication operations on contact entries includes attributes of contact entries that are compared, if an attribute only exists in one contact entry, no conflict is indicated; if multiple contact entries have an identical attribute, and the attributes have a same value, the contact entries are indicated as including duplicated information and to have no conflict; when multiple contact entries have an identical attribute and more than two values are different, a conflict will be detected and the conflict information is recorded, including a name of the conflict item and conflict content, and prompting the user whether to ignore the conflicting information, if the user chooses to ignore the conflicting information, then keeping the conflicted information, if the user selects not to ignore the conflicting information, conflicting information is deleted according to the user selection.

In yet another embodiment, a touch terminal for processing merge and deduplication operations on contact entries includes an application opening module for opening an address book and displaying contact entries; a dragging and merging module for recording selected contact entries according to a selection action on contact entries, receiving a drag action to merge contact entries, and merging the selected contact entries according to the drag action; and an information processing module for removing duplicated information in the selected contact entries during merging, and detecting conflict information in the selected contact entries.

In yet a further embodiment, a touch terminal for processing merge and deduplication operations on contact entries includes a sorting module for sorting contact entries according to contact names.

The present invention provides a processing method and a touch terminal for merge and deduplication operations on contact entries. When an address book is opened, selected contact entries are recorded according to a selection action on the contact entries, a drag action is received to merge contact entries, the selected contact entries are merged according to the drag action; duplicated information is removed in the selected contact entries during merging, and conflict information is detected in the selected contact entries. Thereby, the present invention may delete redundant records in an address book by dragging contact entries to be merged, remove the duplicated information while merging, and detect conflict information, which enhances an effect of an associated touch terminal and improves user experience.

DETAILED DESCRIPTION

A processing method and a touch terminal for merge and deduplication operations on contact entries may include, when carrying out a deduplication operation, a user may use one finger to press one record (contact entry) in an address book list, may use another finger to press another record, and may drag the second record toward a position of the first record. When the two records become overlapped, a merge operation may be carried out with the first record as the record to be kept. All records between the first record and the second record may be merged. Alternatively, only the two pressed records may be merged. Thereby, associated operations may be performed by moving fingers on a touchscreen, which may comply with human operating habits, can process two or more records, and is very flexible. Moreover, a user can complete such operations on one touchscreen, leading to very simple and convenient operations.

Objects, technical solutions, and advantages of processing methods and a touch terminals for merge and deduplication operations on contact entries are described in detail below with reference to the accompanying drawings and exemplary embodiments. It should be understood that the exemplary embodiments are for illustrative purposes. The exemplary embodiments are not intended to limit the claimed invention in any way.

Figures 1, 2:
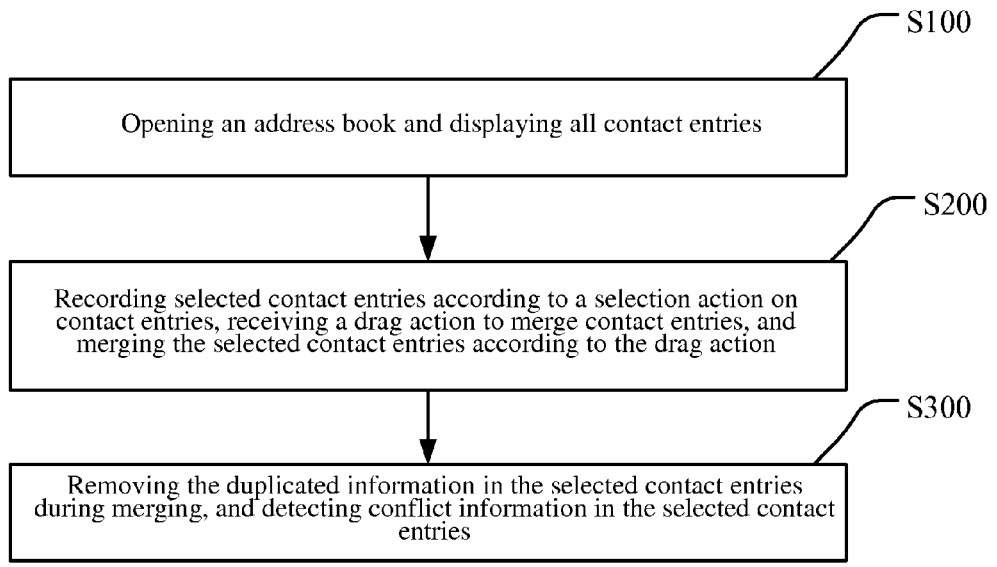
FIG. 1 depicts a flow chart of an exemplary method for processing merge and deduplication operations on contact entries according to the present invention.
FIG. 2 illustrates an exemplary contact list in an exemplary method for processing merge and deduplication operations on contact entries according to the present invention.

With reference to FIG. 1, a flow chart of a method for processing merge and deduplication operations on contact entries may include opening an address book and displaying contact entries (block S100). When opening the address book, the contact entries may be sorted according to contact names. As shown in FIG. 2, using a smartphone as an example, contacts may be displayed to users in the form of a list, which may be sorted in an alphabetical order of contact names. As a result, redundant contact information may be arranged together, which may create a condition for merge and deduplication operations. Selected contact entries may be recorded according to a selection action on contact entries, a drag action to merge contact entries may be received, and the selected contact entries may be merged according to the drag action (block S200).

During specific implementation, a user may use fingers to touch a touchscreen to select contact entries, a selection mode may be set, via a menu during selection, to select two or more contact entries with two touch points. For example, during selection, a selection range may be set to include all contact entries between the two touch points. Alternatively, a selection range may be set to include contact entries at the positions of the two touch points. These operation processes and implementation modes are described in further detail below. Duplicated information in the selected contact entries may be removed during merging, and conflict information may be detected in the selected contact entries (block S300). When merging contact entries, duplicated information in the contact entries may be removed (block S300). For example, the method may include detecting if there is conflict among various information in the selected contact entries. If a conflict among various information is detected, a prompt message may be output to prompt the user to select whether to ignore the conflicted information. If the user selects yes, for example indicating that they wish to ignore conflicted information, the conflicted information may be saved. If the user selects no, for example indicating that they do not wish to ignore the conflicted information, the conflicted information may be deleted according to the user selection.

In order to merge contact entries, conflict detection on entries to be merged may be performed, and each attribute of each contact entry (e.g. contact name, address and other information) may be compared. If an attribute only exists in one contact entry, no conflict may be indicated. On the other hand, if multiple contact entries have an identical attribute (e.g. address), and these attributes have the same value, those entries may be indicated as including duplicated information and as having no conflict, and only one piece of the information needs to be kept during merging. When multiple contact entries have an identical attribute and more than two values are different, a conflict may be detected (e.g. two different addresses), and the conflicted information may be recorded (e.g., a name of the conflicting item and conflicting content may be recorded). In such a circumstance, the user may be prompted to select whether to ignore the conflicted information. If the user chooses to ignore the conflicted information, the conflicted information may be kept. If the user does not select to ignore the conflicted information, the redundant information may be deleted according to the user selection.

Figure 3:
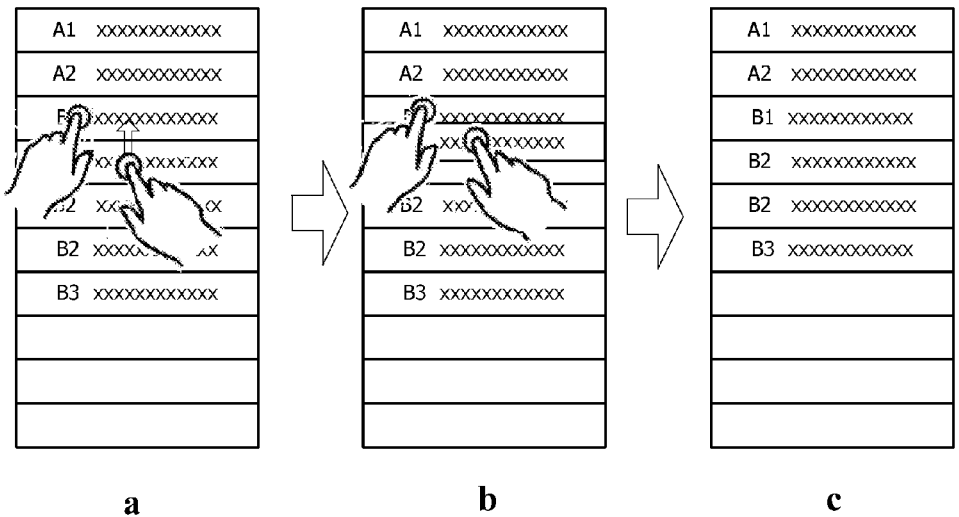
FIG. 3 illustrates merging two contact entries in an exemplary method for processing merge and deduplication operations on contact entries according to the present invention.

A method for processing merge and deduplication operations on contact entries according to the present invention may carry out merge operation on two or more contact entries. When merging two contact entries, when two touch points are detected on a touchscreen, contact entries may be recorded in an address book at coordinates of the two touch points (block S200). A drag action may be received to merge contact entries and, when a first contact entry at one touch point is dragged to partially overlap with a second contact entry at the other touch point, the two contact entries may be merged. Contact entries, in an address book at coordinates of two touch points, may be adjacent contact entries or may be two separated contact entries in the address book. When merging two adjacent contact entries, as shown in FIG. 3, if the user believes that two B1s in FIG. 3a represent the same contact, the user may use one finger to press a first record (i.e. the first contact entry), and may use another finger to press a second record (i.e. the second contact entry) and, when these two records are selected, the second finger may control the second selected record to move the second record toward the first selected record. When the two records become overlapped (as shown in FIG. 3b), the user may release the second finger or both fingers, and at this moment, a merge operation may be carried out with the first record as the record to be kept. The merged contact entry is shown in FIG. 3c. When detecting if a merge operation is to be carried out, a judgment may be reached according to the number of touch points on a touch screen. If there is only one touch point, or the touch points have disappeared, the scenario indicates that the user has initiated a merge operation. At this moment, if two contact entries do not have an overlapping portion, the dragged contact entry may be controlled to move the contact entry to an original position. During merging, a pressed and stationary entry may be used as a merging basis, and may merge the moving entry into the stationary entry. Although the first record may be used as the merge basis, and the dragged second record may be merged into the first record, the second record may be pressed and held, while the first record is dragged to be merged into the second record.

If a user wants to merge more than two contact entries at once, a mode of contact entry selection may be set through a setting function. During merging, when two touch points are detected on the touchscreen, all contact entries between the coordinates of the two touch points may be recorded (block S200). For example, a drag action may be received to merge contact entries, and when a contact entry at one touch point is dragged to partially overlap with a contact entry at the other touch point, all contact entries between the two touch points may be merged.

Figure 4:
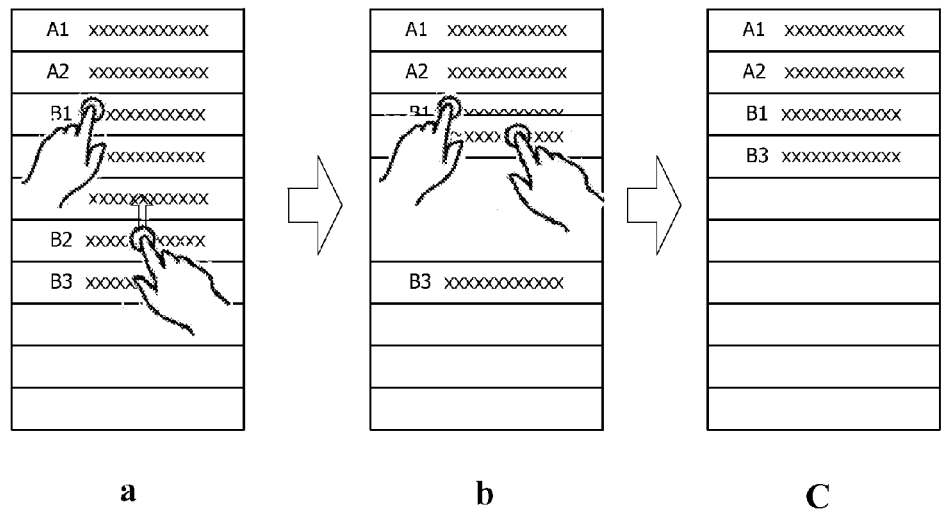
FIG. 4 illustrates merging more than two contact entries in an exemplary method for processing merge and deduplication operations on contact entries according to the present invention.

When selecting contact entries, two or more adjacent records may be selected. As shown in FIG. 2 and FIG. 4, in the address book list in FIG. 2, if the user determines that two contact entries with the name of B1 and two contact entries with the name of B2 represent the same contact, and that the only difference is the name, then the operation shown in FIG. 4 may be carried out. As shown in FIG. 4a, the user may use one finger to press a first record (the foremost contact entry, e.g. the first B1), may use another finger to press a fourth record (the last contact entry, e.g. the first B2), and may use a second finger to press the fourth record and move the fourth record toward the first record. When the fourth record and the first record become overlapped (as shown in FIG. 4b), the use may release their second finger or both fingers, and at this moment, a merge operation may be carried out with the first pressed record as the record to be kept to merge all records between the first pressing and the second pressing. When the fingers are released, the four contact entries may be merged to one B1, as shown in FIG. 4c. When these four records have duplications, similarly using the first record as the basis, duplicated information in other records may be removed, and the method may include detecting if there is conflicting information.

When contact entries are merged, all merged contact entries may become one contact entry in an address book, and the merged entry may have only one name. When more than two contact entries are merged, and if the user desires to keep the name in the middle, two operations may be carried out to achieve this goal. For example, a name of a stationary contact entry may be used as the name after merging, and a dragged contact entry may be merged into the stationary contact entry.

A method for processing merge and deduplication operations on contact entries may include a simple and quick operating method. For example, directly moving fingers on a touchscreen comply with human physiologic habits, and may be intuitive and easy to be accepted by users. The merging operation can process two records and/or multiple records, and may be flexible. Moreover, a user can, for example, complete such operations on only one touchscreen, making it very convenient such that the time required by a user to carry out the operation of merging contact entries may be reduced. In addition, as the processing methods and touch terminals may have the capability of detecting conflicts, the processing methods and touch terminals may prevent merge operations undesired by the user from taking place, thereby ensuring safety.

The merge operations may take place in an address book list. In existing smartphone systems (e.g. the android system), address book lists do not provide such a mode of dragging operation and related function interfaces. Therefore, an address book list may be reloaded by adding corresponding functions to implement the dragging operation on contact entries, through which a user's intent of merge operation can be identified and corresponding displays can be provided to the user.

When an intent of performing a merge operation is identified, the intelligent terminal may implement a function method for carrying out a merge operation on contact entries in a contact database, thereby implementing the actual merge of contact entries. Prior to the execution of a merge operation, a confirmation may be made with the user to prevent a misoperation by the user.

1. Implementing a Dragging Operation on Contact Entries on the Address Book Interface With an android smartphone system as an example, an address book list file on the user interface may be: packages/apps/Contacts/src/com/android/contacts/list/DefaultContactBrowseLis tFragment.java. To achieve longitudinal dragging of a contact entry, a touch event processing function (the onTouchEvent function) of the address book may be revised, and may add support of multi-point touch. First, when two touch points are detected on the touchscreen, and when the second touch point is pressed, all contact entries between the two coordinate points may be recorded as, for example, an ACTION_POINTER_DOWN portion in the following pseudo-code. Subsequently, when the second touch point moves, all recorded contact entries may move toward the contact entry selected by the first finger, and the moving distance may be adjusted according to the distance between the moved contact entries and the contact entry selected by the first finger. Thereby, achieving an effect that all recorded contact entries approach the contact entry selected by the first finger at the same time as, for example, an ACTION_MOVE portion in the following pseudo-code. Lastly, when the second finger leaves the screen, if a contact entry selected by the first finger is determined to have any overlapping portion with a contact entry selected by the second finger, execution of a merge operation may be triggered. Otherwise all moved views may be moved back to original positions as, for example, an ACTION_POINTER_UP portion in the following pseudo-code. Thereby, revision of the touch event processing function (the onTouchEvent function) may be carried out by means of inheriting a parent function.

```
private float yo = -1.0f;    // the Y-axis position of the second point pressed last time
private float firstY1;    // the boundary coordinate position within which the second finger may slide
private float firstY2;    // the boundary coordinate position within which the second finger may slide
int position1;    // the position of the contact entry selected by the first finger in the list
int position2;    // the position of the contact entry selected by the second finger in the list
private chooseObj[ ] choosedobjs;    // for recording contact entries between two fingers and movement amount record
private boolean choosedSameView = false;    // if two fingers select the same contact entry
@Override
public boolean onTouchEvent(MotionEvent  ev)  {    // reload the touchscreen event
....
    int action = ev.getAction( );    // get the event
    int pointcount = ev.getPointerCount( );    // get the number of touch points
    if (pointcount < 2) {    // if a single point touch
    return super.onTouchEvent(ev);    // execute operation of single point touch
    }
    switch (action & MotionEvent.ACTION_MASK) {
....
    case MotionEvent.ACTION_POINTER_DOWN: {    // if it is a pressing event of the second point
    int x1 = (int) ev.getX(0);    // record the coordinate position of the touch point
    int y1 = (int) ev.getY(0);
    int x2 = (int) ev.getX(1);
    int y2 = (int) ev.getY(1);
    yo = y2;    // record the Y-axis position of the second point pressed last time
    firstY1 = y1;    // record the boundary coordinate position within which the second finger may slide
    firstY2 = y2;    // record the boundary coordinate position within which the second finger may slide
    int position1 = pointToPosition(x1, y1);    // get the position of the contact entry pressed by the first finger in the list
    int position2 = pointToPosition(x2, y2);    // get the position of the contact entry pressed by the second finger in the list
    choosedSameView = false;
```

```
        if (position1 == position2) {          // exit in case of the same contact
entry
            choosedSameView = true;
            break;
        }
        // record the views of all contact entries between the first finger and the
second finger
        saveAllchoosedItems(choosedobjs, position1, position2);
        break;
        }
        case MotionEvent.ACTION_MOVE: {       // if it is a point motion event
            float y2 = ev.getY(1);             // get the current Y coordinate of the second
touch point
            // exit in case of exceeding the boundary or the same contact entry
            if (choosedSameView || !isIn(firstY1, y2, firstY2)) break;
            float offd = y2 - yo;              // calculate the current movement distance of the
second touch point
            yo = y2;             // update the Y-axis position of the second point pressed
last time
            // calculate the number of contact entries between the two fingers
            int count = choosedobjs != null ? choosedobjs.length : 0;
            for (int i = 0; i < count; i++) {
              float offdd = offd * i / (count - 1);   // calculate the distance of
movement for the view of each contact entry
              choosedobjs[i].move(offdd);       // move the views of the contact
entries
            }
            break;
        }
        case MotionEvent.ACTION_POINTER_UP: {              // in case of an
event that the second finger is away from the screen
            float y2 = ev.getY(1);      // get the current Y coordinate of the second
touch point
            // if the first selected contact entry and the second selected contact
entry are close enough, trigger a merge operation
            if (|y2 - y1| < minDistance) {
              madapter.mergeContacts(choosedobjs);         // merge operation
              madapter.notifyDataSetChanged( );    // refresh
              break;
            }
            // if they cannot be merged, give up and restore the list
            int count = choosedobjs != null ? choosedobjs.length : 0;
            for (int i = 0; i < count; i++) {
              choosedobjs[i].moveBack( );     // move all entry views back to the
original positions
            }
            choosedobjs = null;                      // empty the selected contact
entries
            madapter.notifyDataSetChanged( );    // refresh
            break;
        }
        default:;
        }
        return true;
    }
```

The choosedobjs function, in the pseudo-code above, may record all contact entries selected by a first finger and a second finger, each contact entry may be recorded in the object of chooseObj, which may record a view of the contact entry, contact information, a displacement record, and movement of a view may also be implemented by the move method in this object. The move method may be implemented by setting an offset through the offsetTopAndBottom(d) function, i.e. when dragging the contact entry, an offset may be set through the function offsetTopAndBottom(d) for the view, and specific pseudo-code may be as follows:

```
        private void move(int d) {        //move method
            view.offsetTopAndBottom(d); // set offset
            offset += d;                  // record offset
        }
```

When a second finger leaves the touchscreen, and if a merge operation is identified that can be carried out, a merge operation may be triggered to merge selected contact entries through the madapter.mergeContacts(choosedobjs) function, as shown in the above madapter.mergeContacts(choosedobjs) function.

2. Contact Entries Merge and User Confirmation Operations

To merge contact entries, conflict detection may be performed on entries to be merged, and each attribute of each contact entry (e.g. contact name, address and other information) may be compared. If an attribute only exists in one contact entry, no conflict may be indicated. If multiple contact entries have an identical attribute (e.g. address), and these attributes have the same value, there may be no conflict. When more than two values are different, a conflict may be detected (e.g. two different addresses), and at this moment, conflicting information may be recorded (e.g., a name of the conflict item and conflicting content may be recorded). A function for conflict check may be: private boolean checkConflict(String item1, String item2, String tag) as follows:

```
//   function for conflict check
private boolean checkConflict(String item1, String item2, String
tag) {
     if(item1 == null) { // if it is the first record, it is impossible
to have conflict, record directly
          item1 = item2;
          return false;
     } else if (item2 == item1){    // if two records are the same, no
conflict either
          return false;
     } else {
          conflictString.append(tag + item1 + " " + item2); // in case
of conflict, record the conflict content
          return true;
     }
}
```

In the function for conflict check, the function may return true if a conflict is detected, otherwise the function may return false. If no conflict is detected, a value of the parameter item1 may record the value to be saved. The function conflictString, in the code above, may be a character string to record the conflict content, which may be included in the code below. Conflict check may not be performed on telephone numbers, as one contact may use multiple numbers, however, duplicated telephone numbers may be removed.

A conflict check process may also be a process of merging attributes of contact entries, which may not be written into an associated database. In this process, one value for each contact entry attribute may be kept. If there is no conflict, a unique value may be saved. In case of a conflict, the attribute value of the contact entry that is the closest to the entry selected by the first finger may be saved.

When attribute values of each contact entry are present, the attribute values can be written into the database. In case of a conflict, however, a confirmation may be made with the user by informing the user of the conflict content. If the user confirms that the conflict may be ignored, an operation to write the attribute value into the database may be performed. A process of a merge operation may be as shown by the following pseudo-code:

```
private StringBuilder conflictString; // conflict record character string
// the following is used for attribute information of contact entries to be
ultimately saved
     private String name, company, email, im, address, notes, nickname,
website;
     private HashMap<String, String> phoneNumber = new HashMap<String,
String>( );
     public void mergeContacts(final chooseObj[ ] contacts) {
          boolean haveConflict = false;          // set a conflict tag
          conflictString = new StringBuilder( );             // set a conflict record
character string
          int count = contacts.length;                // number to be merged
          for (int i = 0; i<count; i++) {    // perform conflict check on each entry
          // check if there is name conflict
haveConflict|=checkConflict(name,getNameFromUri(contacts[i].uri),"Name");
          // check if there is company name conflict
          haveConflict|=checkConflict(company,getCompanyFromUri(contacts[i].uri),
"Company");
          // check if there is mailing address conflict
          haveConflict|=  checkConflict(email,  getEmailFromUri(contacts[i].uri),
"Email");
          // check if there is instant message address conflict
          haveConflict|=checkConflict(im,getIMFromUri(contacts[i].uri),"IM");
          // check if there is address conflict
          haveConflict|=checkConflict(address,getAddressFromUri(contacts[i].uri),
"Address");
          // check if there is note conflict
          haveConflict |= checkConflict(notes, getNotesFromUri(contacts[i].uri),
"Notes");
          // check if there is nickname conflict
          haveConflict|=checkConflict(nickname,getNickNameFromUri(contacts[i].
uri), "NickName");
          // check if there is website conflict
          haveConflict|=checkConflict(website,getWebsiteFromUri(contacts[i].uri),
"Website");
               // record all telephone numbers (with duplicated ones removed)
               String number, kind;
               getPhoneNumberFromUri(contacts[i].uri, number, kind);
               if (!phoneNumber.containsKey(number)) {
               phoneNumber.put(number, kind);
               }
          }
          if (haveConflict) {       // in case of a conflict, pop up a dialogue box and
request the user to confirm
               new AlertDialog.Builder(mContext)
                    .setTitle("there is a conflict, whether to merge, and the conflict is: ");
// set a title
                    .setMessage(conflictString.toString( )); // set conflict content
                    .setPositiveButton("ignore       the       conflict",       new
DialogInterface.OnClickListener( ) {
                    // if the user selects, then ignore the conflict, and carry out the
merge operation
```

-continued

```
        public void onClick(DialogInterface dialog, int which) {
            mergeContacts(phoneNumber, name, company, email, // merge
operation
                im, address, notes, nickname, website, contacts);
        }
    })
    .setNegativeButton("cancel", null)// if the user cancels, then nothing
will be carried out
    .create( ).show( );
    } else {    // if there is no conflict, directly carry out the merge operation
without prompting
        mergeContacts(phoneNumber, name, company, email,
            im, address, notes, nickname, website, contacts);
    }
}
```

It can be seen from the code above that a first part may be conflict check, and in case of a conflict, a dialogue box may pop up to tell the user what content has conflicts. If the user selects to ignore the conflict, the merge operation may be performed. If no conflict is detected, the merge operation may be performed without prompting the user.

A process to merge contact entries may first write attribute information, of contact entries obtained in the process of conflict check, into a database record of a contact entry selected by a first finger, for example, and deleting other contact entries may be deleted. The merge operation function may be as follows:

```
    // The function to carry out the merge operation
    private void mergeContacts(HashMap<String,  String>
phoneNumber, String name, String company, String email,
        String im,  String  address,  String  notes,  String
nickname,  String website, chooseObj[ ] contacts) {
        int count = contacts.length;        // number to be merged
        // the first record is the record selected by the first finger, and record
all information to be merged into the contact entry pointed by URI
        EditAndSaveContact(contacts[0].uri, phoneNumber, name, company,
            email, im, address, notes, nickname, website);
        // delete other contact entries
        for (int i = 1; i<count; i++) {
            deleteTheContact(contacts[i].uri);
        }
    }
```

Figure 5:
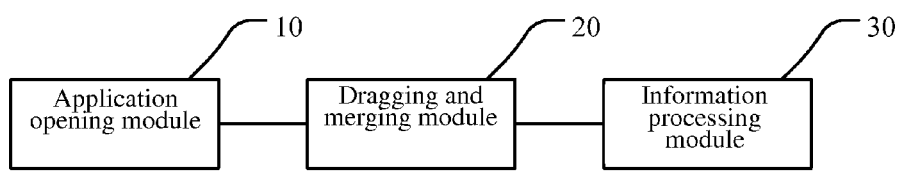
FIG. 5 depicts a structural block diagram of an exemplary touch terminal for processing merge and deduplication operations on contact entries according to the present invention.

Accordingly, a touch terminal for implementing the above method for processing merge and deduplication operations on contact entries may be a smartphone as shown in FIG. 5, and may include an application opening module 10, a dragging and merging module 20, and an information processing module 30. The application opening module 10 may be used for opening an address book and displaying all contact entries. The dragging and merging module 20 may be used for recording selected contact entries according to a selection action on contact entries, receiving a drag action to merge contact entries, and merging the selected contact entries according to the drag action. The information processing module 30 may be used for removing duplicated information in the selected contact entries during merging, and detecting conflict information in the selected contact entries.

Furthermore, the touch terminal may include a sorting module for sorting the contact entries according to the contact names.

In summary, a touch terminal and method for processing merge and deduplication operations on contact entries can delete redundant records in an address book by dragging contact entries to be merged, may remove duplicated information while merging, and may detect conflict information, which may enhance an effect of the touch terminal and may improve user experience.

In addition, a touch terminal and method for processing merge and deduplication operations on contact entries may carry out operations by directly moving fingers on a touchscreen, which may comply with human operating habits, can process two or more records, and may be flexible. Moreover, a user can complete such operations on one touchscreen, leading to very simple and convenient operations.

It should be understood that, to those skilled in the art, equivalent substitutions or modifications may be made according to the technical solutions and inventive concepts of the present invention, and all of these substitutions or modifications shall be encompassed by the scope of protection of the appended claims.

The invention claimed is:

1. A method for processing merge and deduplication operations on contact entries, the method comprising:
   opening an address book and displaying contact entries;
   detecting a first and a second touch points on a touchscreen;
   selecting contact entries to be merged by creating a contact entry list having, as a first contact entry, a contact at a spatial coordinate of the first touch point, and having, as a last contact entry, a contact at a spatial coordinate of the second touch point, the contact entry list further including all contact entries between the spatial coordinate of the first touch point and the spatial coordinate of the second touch point;
   recording the selected contact entries in an object;
   merging the selected contact entries based on the first contact entry being dragged to overlap with the second contact entry;
   removing duplicated information in the selected contact entries during the merging;
   detecting conflict information in the selected contact entries; and
   in response to determining the conflict information, saving a conflicting attribute value of a first contact entry associated with the first touch point.

2. The method for processing merge and deduplication operations on contact entries according to claim 1, further comprising:
   sorting the contact entries according to contact names.

3. The method for processing merge and deduplication operations on contact entries according to claim 1, further comprising:

when detecting the first and the second touch points on the touchscreen, recording contact entries in the address book at the spatial coordinates of the two touch points; and in response to receiving a the drag action to merge contact entries, merging these two contact entries when the first contact entry corresponding to the first touch point is dragged to partially overlap with a second contact entry corresponding to the second touch point.

4. The method for processing merge and deduplication operations on contact entries according to claim 3, wherein the first and second contact entries in the address book, at the coordinates of the first and second touch points, are two adjacent contact entries or two separated contact entries in the address book.

5. The method for processing merge and deduplication operations on contact entries according to claim 1, further comprising:

when dragging a contact entry, an offset is set through a function offsetTopAndBottom(d) for an associated view.

6. The method for processing merge and deduplication operations on contact entries according to claim 1, further comprising:

when merging contact entries, removing duplicated information in the selected contact entries;

detecting if there is conflict among information in the selected contact entries;

if conflict is detected among information in the selected contact entries, outputting a prompt message to prompt a user whether to ignore the conflicted information;

if the user selects to ignore the conflicting information, saving the conflicted information.

7. The method for processing merge and deduplication operations on contact entries according to claim 1, wherein the selected contact entries are merged through a function madapter.mergeContacts(choosedobjs).

8. A method for processing merge and deduplication operations on contact entries, the method comprising:

opening an address book and displaying contact entries;

detecting a first and a second touch points on a touchscreen;

receiving a user input to select contact entries corresponding to the first and the second touch points;

recording the selected contact entries in an object;

merging the selected contact entries based on a detection that a first contact entry, of the selected contact entries, is moved to a spatial coordinate overlapping a spatial coordinate of a second contact entry of the selected contact entries;

removing duplicated information in the selected contact entries during merging; and detecting conflict information in the selected contact entries when merging contact entries, and removing duplicated information in the selected contact entries;

detecting if there is conflict among information in the selected contact entries;

if conflict is detected among information in the selected contact entries, outputting a prompt message to prompt a user whether to ignore the conflicted information;

if the user selects to ignore the conflicting information, saving the conflicted information;

wherein attributes of each contact entry are compared, if an attribute only exists in one contact entry, no conflict is indicated; if multiple contact entries have an identical attribute, and the attributes have a same value, the contact entries are indicated as including duplicated information and to have no conflict;

when multiple contact entries have an identical attribute and more than two values are different, a conflict will be detected and the conflict information is recorded, including a name of the conflict item and conflict content, and prompting the user whether to ignore the conflicting information, if the user chooses to ignore the conflicting information, then keeping the conflicted information, if the user selects not to ignore the conflicting information, conflicting information is deleted according to the user selection.

9. The method for processing merge and deduplication operations on contact entries according to claim 8, further comprising:

sorting the contact entries according to contact names.

10. The method for processing merge and deduplication operations on contact entries according to claim 8, further comprising:

when detecting the first and the second touch points on the touchscreen, recording all contact entries between spatial coordinates of the two touch points in the object;

in response to receiving the drag action to merge contact entries, merging the all contact entries when a first contact entry corresponding to the first touch point is dragged to partially overlap with a second contact entry corresponding to the second touch point.

11. The method for processing merge and deduplication operations on contact entries according to claim 8, further comprising:

when detecting the first and the second touch points on the touchscreen, recording contact entries in the address book at spatial coordinates of the first and second touch points;

in response to receiving the drag action to merge contact entries, merging these two contact entries when a first contact entry corresponding to the first touch point is dragged to partially overlap with a second contact entry corresponding to the second touch point.

12. The method for processing merge and deduplication operations on contact entries according to claim 11, wherein the first and second contact entries in the address book, at the coordinates of the first and second touch points, are two adjacent contact entries or two separated contact entries in the address book.

13. The method for processing merge and deduplication operations on contact entries according to claim 10, further comprising:

when dragging a contact entry, an offset is set through a function offsetTopAndBottom(d) for an associated view.

14. The method for processing merge and deduplication operations on contact entries according to claim 8, wherein selected contact entries are merged through a function madapter.mergeContacts(choosedobjs).

15. The touch terminal according to claim 8, further comprising:

when merging contact entries, removing duplicated information in the selected contact entries;

detecting if there is conflict among information in the selected contact entries;

if conflict is detected among information in the selected contact entries, outputting a prompt message to prompt a user whether to ignore the conflicted information;

if the user selects to ignore the conflicting information, saving the conflicted information.

16. The touch terminal according to claim 15, wherein attributes of contact entries are compared, if an attribute only exists in one contact entry, no conflict is indicated;

if multiple contact entries have an identical attribute, and the attributes have a same value, the contact entries are indicated as including duplicated information and to have no conflict;

when multiple contact entries have an identical attribute and more than two values are different, a conflict will be detected and the conflict information is recorded, including a name of the conflict item and conflict content, and prompting the user whether to ignore the conflicting information, if the user chooses to ignore the conflicting information, then keeping the conflicted information, if the user selects not to ignore the conflicting information, conflicting information is deleted according to the user selection.

17. A touch terminal for processing merge and deduplication operations on contact entries, the touch terminal comprising:

an application opening module for opening an address book and displaying contact entries;

a touchscreen for detecting a first and a second touch points and selecting contact entries at spatial coordinates of the first and the second touch points;

a dragging and merging module for creating a contact entry list having, as a first contact entry, a contact at a spatial coordinate of the first touch point, and having, as a last contact entry, a contact at a spatial coordinate of the second touch point, the contact entry list further including all contact entries between the spatial coordinate of the first touch point and the spatial coordinate of the second touch point, recording the selected contact entries, receiving a drag action on the touchscreen to merge the selected contact entries, and merging the selected contact entries based on the first contact entry being dragged to partially overlap with the second contact entry; and an information processing module for removing, according to an input from a user, duplicated information in the selected contact entries during the merging, and detecting conflict information in the selected contact entries.

18. The touch terminal according to claim 17, further comprising:

a sorting module for sorting the contact entries according to contact names.

19. The touch terminal according to claim 17, further comprising:

when the first and second touch points are detected on the touchscreen, recording all contact entries between the coordinates of the two touch points; and when a first contact entry corresponding to the first touch point is dragged to partially overlap with a second contact entry corresponding to the second touch point, the first and second contact entries are merged.

* * * * *